United States Patent [19]

Matsumoto et al.

[11] Patent Number: 5,178,940
[45] Date of Patent: Jan. 12, 1993

[54] COMPOSITE OR ASYMMETRIC FLUORINE-CONTAINING POLYIMIDE MEMBRANE, A PROCESS FOR MANUFACTURING THE SAME AND A METHOD FOR THE SEPARATION AND CONCENTRATION OF GAS USING THE SAME

[75] Inventors: Kenji Matsumoto; Xu Ping, both of Osaka, Japan

[73] Assignee: Nitto Denko K.K., Osaka, Japan

[21] Appl. No.: 879,186

[22] Filed: May 6, 1992

Related U.S. Application Data

[62] Division of Ser. No. 859,874, Mar. 30, 1992.

[30] Foreign Application Priority Data

Apr. 15, 1991 [JP] Japan ................. 3-111164
Oct. 4, 1991 [JP] Japan ................. 3-285732

[51] Int. Cl.$^5$ .................... B01D 53/22; B32B 3/26
[52] U.S. Cl. .................... 428/304.4; 55/16; 55/158; 427/245; 427/246; 428/308.4; 428/306.6; 428/315.5; 521/64

[58] Field of Search .......... 428/304.4, 308.4, 306.6, 428/315.5; 55/16, 158; 521/64

[56] References Cited

FOREIGN PATENT DOCUMENTS

| | | |
|---|---|---|
| 0241937 | 10/1987 | European Pat. Off. . |
| 0265898 | 5/1988 | European Pat. Off. . |
| 0315981 | 5/1989 | European Pat. Off. . |
| 0437611 | 7/1991 | European Pat. Off. . |
| 0446947 | 7/1991 | European Pat. Off. . |
| WO9100774 | 1/1991 | PCT Int'l Appl. . |

*Primary Examiner*—Morton Foelak
*Attorney, Agent, or Firm*—Sughrue, Mion, Zinn, Macpeak & Seas

[57] ABSTRACT

A composite or asymmetric membrane for separating and concentrating a particular component from a mixture of gases. The asymmetric membrane is of a fluorine-containing aromatic polyimide resin of the 6FDA type. The composite membrane has a thin film of an elastomeric polymer formed on a supporting film of a fluorine-containing aromatic polyimide resin of the 6FDA type.

2 Claims, No Drawings

COMPOSITE OR ASYMMETRIC FLUORINE-CONTAINING POLYIMIDE MEMBRANE, A PROCESS FOR MANUFACTURING THE SAME AND A METHOD FOR THE SEPARATION AND CONCENTRATION OF GAS USING THE SAME

This is a divsiional of application Ser. No. 07/859,874, filed Mar. 30, 1992.

BACKGROUND OF THE INVENTION

1. Field of the Invention

This invention relates to a fluorine-containing polyimide membrane for gas separation. More particularly, it is concerned with a composite or asymmetric membrane used for separating and concentrating a particular component from an industrial mixture of gases, a process for manufacturing the same, and a method of separating and concentrating a particular component from a mixture of gases using the same.

2. Description of the Prior Art

It is known that the polyimides make separation films or membranes having good heat- and chemical-resistant properties, as they have a high glass transition temperature and rigid structure. The known polyimides have, however, been unsatisfactory in permeability, though they exhibit high selectivity, as compared with other vitreous polymers.

Fluorine-containing polyimides have been found to exhibit high permeability, as compared with the prior polyimides, while retaining high selectivity, due to, the bulkiness of the hexafluoroisopropyl group, $-C(CF_3)_2-$, which they contain, and the improved solubility of gas by fluorocarbons. More specifically, there have, for example, been proposed homogeneous polyimide membranes composed of an aromatic acid anhydride including 5,5'-2,2,2-trifluoro-1-(trifluoromethyl)ethylidene-bis-1, 3-isobenzofurandione (6FDA), and an aromatic diamine, methylenedianiline, etc., as described in Japanese Patent Application Laid-Open No. 123420/1988, U.S. Pat. No. 4,705,540, Japanese Patent Application Laid-Open No. 262925/1989 and Japanese Patent Application Laid-Open No. 261524/1990.

These homogeneous polyimide membranes have, however, been still unsatisfactory in permeability, selectivity, and applicability to different kinds of gases. Moreover, the mechanical strength required of those membranes have made them too large in thickness to exhibit any permeation rate that is satisfactory for practical and industrial use.

SUMMARY OF THE INVENTION

Under these circumstances, it is a principal object of this invention to provide a fluorine-containing polyimide membrane having high gas permeability and selectivity, as well as good heat and chemical resistances, and mechanical strength.

We, the inventors of this invention, have found that composite or asymmetric fluorine-containing polyimide membrane having a specific composition exhibits a high gas separation factor and a very high rate of gas permeation, and is applicable to various kinds of mixed gases to separate and concentrate a particular component efficiently.

Thus, the above object is essentially attained by a composite fluorine-containing polyimide membrane comprising a supporting film of a fluorine-containing polyimide resin consisting mainly of repeating units represented by formula 1

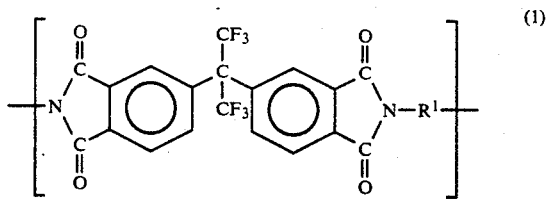

where $R^1$ is a divalent aromatic, alicyclic or aliphatic hydrocarbon group, or a divalent organic group consisting of divalent aromatic, alicyclic or aliphatic hydrocarbon groups bonded to each other by a divalent organic bonding group, and a thin film of an elastomeric polymer formed on the supporting film, or an asymmetric fluorine-containing polyimide film comprising a fluorine-containing polyimide resin consisting mainly of recurring units represented by formula 1, and having an anisotropic structure.

The composite membrane of this invention exhibits a hydrogen permeation rate of $1.6 \times 10^{-3}$ $cm^3/cm^2 \cdot s \cdot cmHg$, a carbon dioxide permeation rate of $7.2 \times 10^{-4}$ $cm^3/cm^2 \cdot s \cdot cmHg$, an oxygen permeation rate of $1.3 \times 10^{-4}$ $cm^3/cm^2 \cdot s \cdot cmHg$, an ideal hydrogen/carbon monoxide separation factor of 140 or above, an ideal carbon dioxide/methane separation factor of 60 or above and an ideal oxygen/nitrogen separation factor of 6.5 or above when it is used, for example, at a temperature of 25° C. with a pressure difference of 2 atoms, between both sides thereof.

The asymmetric membrane of this invention exhibits a hydrogen permeation rate of $1.8 \times 10^{-3}$ $cm^3/cm^2 \cdot s \cdot cmHg$, a carbon dioxide permeation rate of $1.0 \times 10^{-3}$ $cm^3/cm^2 \cdot s \cdot cmHg$, an oxygen permeation rate of $3 \times 10^{-4}$ $cm^3/cm^2 \cdot s \cdot cmHg$, an ideal hydrogen/carbon monoxide separation factor of 60 or above, an ideal carbon dioxide/methane separation factor of 40 or above and an ideal oxygen/nitrogen separation factor of 5.5 or above when it is used, for example, at a temperature of 25° C. with a pressure difference of 2 atoms, between both sides thereof.

DETAILED DESCRIPTION OF THE INVENTION

The membrane of this invention comprises a fluorine-containing polyimide resin consisting mainly of recurring units represented by formula 1, and preferably containing at least 90% thereof. It is a resin of the type called 5,5'-2,2,2-trifluoro-1-(trifluoromethyl)ethylidene-bis-1,3-isobenzofurandione (6FDA). In formula 1, $R^1$ is a divalent aromatic, alicyclic or aliphatic hydrocarbon group, or divalent organic group consisting of such hydrocarbon groups bonded to each other by a divalent organic bonding group. Phenylene groups having 6 to 12 carbon atoms are examples of the preferred divalent aromatic hydrocarbon groups. Methylene, isopropylidene, ether, sulfide, sulfone and hexafluoroisopropyl groups are examples of the organic bonding groups which can be used to bond divalent aromatic hydrocarbon groups to form an organic group. Linear and branched alkylene groups having 1 to 10 carbon atoms are examples of the preferred divalent aliphatic hydrocarbon groups. Ether, sulfide and polyoxyalkylene groups are examples of the organic bonding groups which can be used to bond divalent aliphatic hydrocarbon groups to form a divalent organic group. Cyclohexylene and alkyl-substututed cyclohexylene groups having 6 to 12 carbon atoms are examples of the preferred divalent alicyclic hydrocarbon groups. Methylene, isopropylidene, ether, sulfide and sulfone groups are examples of the organic bonding groups which can be used to bond divalent alicyclic hydrocarbon groups to form a divalent organic group.

The divalent organic group $R^1$ is preferably an aromatic hydrocarbon group, or an aromatic hydrocarbon group consisting of two aromatic hydrocarbon groups bonded to each other by an organic bonding group such as a methylene, isopropylidene, ether, sulfide, sulfone or hexafluoroisopropyl group, to ensure the formation of a membrane having high heat an hydrocarbon resistances. Specific examples of the preferred aromatic groups are:

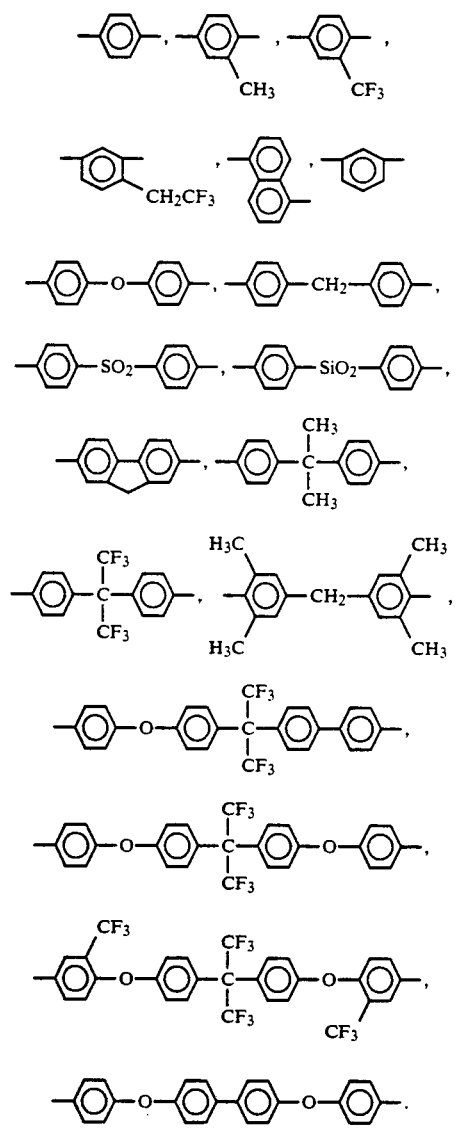

(2)

The fluorine-containing polyimide resin comprising any of these aromatic groups and 6FDA acid anhydride preferably has a glass transition temperature of from 200° C. to 400° C. and particularly from 300° C. to 400° C. in order to form a membrane having good physical properties and gas selectivity. It preferably has an intrinsic viscosity, $\eta$, of from 0.1 to 7, and particularly form 0.5 to 3 ($\eta = 1/0.5$ 1 n viscosity of solution/viscosity of solvent, as measured at a temperature of 30° C. with the solution having a polymer concentration of 0.5 g/100 ml of N-methyl-2-pyrrolidone as the solvent). The intrinsic viscosity of the polymer is closely related to its degree of polymerization, or its molecular weight. If its intrinsic viscosity is too low, it fails to form a proper film, and if its intrinisic viscosity is too high, it is difficult to dissolve in a solvent and enables only an inefficient film-forming operation.

The fluorine-containing polyimide resin of 6FDA type which is used for the purpose of this invention can be prepared by a known method of polymerization. For example, a polyamic acid solution is prepared by reacting a N-methylpyrrolidone solution of 6FDA acid anhydride and diamine at room temperature. The obtained polyamic acid solution is subjected to either azeotropic distillation for thermal imide formation, or dehydration for chemical imide formation.

Although there is no particular limitation to the process which can be employed for manufacturing an asymmetric membrane of this invention having an anisotropic structure, or a supporting film for a composite membrane of this invention, a preferred process will hereinafter be described. An appropriate supporting material is coated with a film-forming solution prepared from a fluorine-containing polyimide resin comprising repeating units represented by formula 1, and a first organic solvent which is compatible with water. The coated material is left to stand for a period of from one second to five minutes, preferably from 20 seconds to three minutes, preferably in a environment having as low a humidity as possible, to allow the partial evaporation of the solvent. Then, the material is dipped for a short period of time in a second organic solvent which does not dissolve the fluorine-containing polyimide resin, but which is compatible with both the first organic solvent and water as a solidifying agent, and it is thereafter dipped in water, whereby an asymmetric film having an anisotropic structure is obtained. It is dried and heat treated to yield an asymmetric, or supporting film of the fluorine-containing polyimide resin.

Examples of the first organic solvent, which is used to prepare film-forming solvent, are N-alkyl-2-pyrrolidone such as N-methyl-2-pyrrolidone, N-alkyl-2-piperidone such as N-methyl-2-piperidone, dialkylacetamides such as dimethylacetamide, and dialkylformamides such as dimethylformamide. N-methyl-2-pyrrolidone is, among others, preferred.

The film-forming solution may contain the polyimide resin at a concentration of from 3 to 40%, preferably from 5 to 30%, by weight. If it contains too much of the resin, it has too high a viscosity to be uniformly coated to the supporting material, and can, moreover, form only a membrane having a gas permeation rate which is too low for the purpose of gas separation. The concentration of the resin in the film-forming solution is so controlled that the solution may have a viscosity of 50 to 5000 P, preferably 100 to 2000 P.

If it is desirable to form a membrane having a high gas permeation rate rather than a high separation factor, it is possible to add a swelling agent to a film-forming solution to facilitate the formation of a spongy porous supporting layer. The swelling agent which can be added to the solution is a liquid organic compound which is soluble in the first organic solvent and water, which has a solidification number of 50 to 200 as defined by the minimum quantity in milliliters thereof to be added to 50 ml of a 2%-by-weight N-methyl-2-pyrolidone solution of the polyimide resin to make it turbid as a result of the precipitation of the resin at a temperature of 25° C., and which has a boiling point of 50° C. to 120° C. at normal pressure. It can be selected from among cyclic ethers, aliphatic ketones, alcyclic ketones, lower aliphatic carboxylic acids and the lower alkyl esters of lower aliphatic carboxylic acids.

Specific examples of the preferred swelling agents are tetrahydrofuran, dioxane, acetone, methyl ethyl ketone, dietyl ketone, cyclohexane, acetic acid, formic acid, methyl formate, ethyl formate and methyl acetate. The film-forming solution may contain 30 to 300 parts, preferably 50 to 150 parts, by weight of swelling agent for 100 parts by weight of polyimide resin. If the proportion of the swelling agent is too large, the solution is likely to lack uniformity, and if the proportion is too small, it is likely that the solution may fail to form a film having a satisfactorily high gas permeability. The swelling agent can, for example, be dissolved in the film-forming solution if a settled quantity of that is added to the solution containing the dissolved polyimide resin, and if the solution is stirred at room temperature, or under heat, if required.

The coating thickness of the film-forming solution on the supporting material is so controlled as to achieve a film thickness of 50 to 400 microns, preferably 100 to 300 microns. The supporting material may, for example, be a sheet having a smooth surface, or a woven or nonwoven fabric. The use of a woven or nonwoven fabric is preferable for the purpose of this invention, as it reinforces the membrane formed thereon.

The supporting material is coated with the film-forming solution, and is dipped for a short period of time in the second organic solvent, and thereafter in water, whereby a membrane having an anisotropic structure is obtained. The membrane has a dense skin layer on its surface. It is appropriately dried and heat treated to yield an asymmetric fluorine-containing polyimide membrane of this invention.

The second organic solvent is one which does not dissolve the polyimide resin, but is miscible with both the first organic solvent and water. Specific examples are lower aliphatic alcohols such as methanol, ethanol, propanol (particularly isopropanol) and butanol (particularly t-butanol), alkylene glycols such as ethylene glycol and propylene glycol, acetone, glycerol, tetrahydrofuran, and ethylene glycol monomethyl or monoethyl ether. The coated material is dipped in the second organic solvent at a temperature of 0° to 100° C. for a period not exceeding one hour, preferably not exceeding five minutes. The water in which it is dipped may have a temperature of 0° to 50° C. preferably 0° to 30° C., and more preferably 0° to 20° C.

The membrane which is formed as hereinabove described contains water and need be dried. Although a variety of methods can be employed for drying the membrane, it is, for example, effective to dip the membrane in an organic solvent which is miscible with both water and an organic solvent (e.g. alcohol) and then in an organic solvent which is immiscible with water (e.g. hexane), and dry it at room temperature, or under heat if required, whereby an asymmetric membrane having a satisfactorily high gas permeation rate can be obtained.

If the dry membrane is heat treated, it is possible to form a fluorine-containing polyimide membrane having still higher gas separating properties and a stable permeability. While there is no particular limitation to the conditions for its heat treatment, it is, for example, effective to heat the film at a rate not exceeding 10° C. per minute for period of one to three hours until it is heated to a maximum temperature in the neighborhood of the glass transition temperature of the flurine-containing polyimide resin, and preferably in the range of 150° C. to 350° C.

The asymmetric membrane obtained as hereinabove described is also used as a supporting film for a composite membrane of this invention. The composite membrane can be made if a thin film of an elastomeric polymer is formed on the dense skin layer of the asymmetric film.

The term "elastomeric polymer" as herein used means a polymer which can form a flexible film. Specific examples of the polymers which can be employed for the purpose of this invention are homopolymers or copolymers of ethylenic monomers or conjugated diene monomers such as polypropylene, polyvinyl chloride, an ethylene-propylene copolymer, an ethylene-propylene-diene copolymer, polybutadiene, polyisoprene, chloroprene rubber, poly(4-methyl-pentene-1), a butadiene-styrene copolymer, an isoprene-isobutylene copolymer and polyisobutylene; copolymers of these monomers, and monomers containing functional groups, such as acrylonitrile, (meth)acrylate and (meth)acrylic acid; and copolymers containing both soft and hard segments, such as polyether polyol, polyurethane polyol, polyurethane polyester and polyamide polyether. It is also possible to use, for example, an epoxy resin which is curable by a long- and straight-chain curing agent, ethyl cellulose, and butoxy resin.

It is preferable to employ an elastomeric polymer having a separation factor of 3 or above to a specific gas, a permeability coefficient which is higher than that of the fluorine-containing polyimide resin forming the supporting film, and a softening temperature of at least 50° C., and more preferably at least 80° C. More specifically, it is preferable to employ a homopolyer or copolymer of and ethylenic or conjugated diene monomer.

The composite membrane of this invention can be made by coating the skin layer of the fluorine-containing polyimide resin supporting film with a solution of an elastomeric polymer in an organic solvent, curing the polymer if required, and drying the coating. The solution contains the elastomeric polymer at a concentration of 0.05 to 10%, preferably 0.1 to 5%, by weight, and is so coated as to form a thin film having a thickness of 0.01 to 5 microns, preferably 0.05 to 1 micron, on the supporting film. Any appropriate means can be employed for coating the supporting film with the solution of the elastomeric polymer. It is, for example, possible to employ applicator, or micro-gravure coater. It is also possible to dip the supporting film in the solution.

This invention does not contemplate any limitation as to the shape of a membrane, or module, but can be embodied, for example, in the form of a spiral, or hollow yarn module.

If a mixture of two or more gases is brought into contact with the composite or asymmetric membrane of this invention, a particular gas is separated and concentrated from the mixture as a result of selective permeation. There is no particular limitation to the mixture of gases to which this invention is applicable. The mixture may, for example, be of carbon dioxide and methane, of oxygen and nitrogen, of hydrogen and carbon monoxide, or of steam and oxygen or nitrogen or air. The membrane of this invention is, however, particularly useful for separating a mixture of carbon dioxide and methane to concentrate methane, while allowing carbon dioxide to pass, or for removing steam from the air.

The invention will now be described in further detail with reference to a variety of specific examples. It is, however, to be understood that the following description is not intended for limiting the scope of this invention.

EXAMPLES 1 to 4

A fluorine-containing aromatic polyimide resin containing repeating units represented by formula 3 was prepared by a chemical imide-forming process carried out by adding acetic anhydride and pyridine to a polyamic acid solution (solvent: N-methyl-2-pyrrolidone) as a precursor at room temperature:

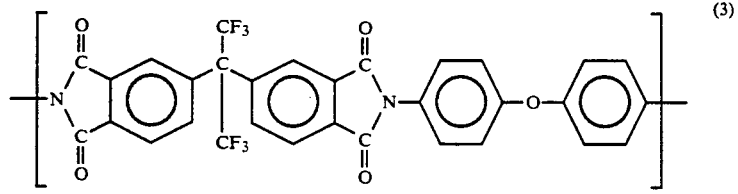

(3)

The physical properties of the resin were as follows:

| | |
|---|---|
| Glass transition temperature: | 297° C. (as measured by DSC); |
| Weight-average molecular weight: | 150,000 (as measured by GPC); |
| Number-average molecular weight: | 36,000 (as measured by GPC); |
| Density: | 1.44 (g/cm$^3$); |
| Intrinsic viscosity: | 2.05 (dl/g) |

(solvent: N-methyl-2-pyrrolidone).

Eight parts by weight of the fluorine containing polyimide resin was added to 92 parts by weight of N-methyl-2-pyrrolidone as a first organic solvent, and was dissolved therein by at least 48 hours of stirring, whereby a viscous polyimide solution was obtained. The polyimide solution was filtered under pressure in the presence of nitrogen gas, and the filtrate was debubbled at a reduced pressure to yield a uniform and transparent yellow film-forming solution. The film-forming solution was cast on a nonwoven polyester fabric at a surface velocity of 5 cm/sec. by an applicator to form a layer having a thickness of 200 microns. After the fabric had been left at a standstill for 60 seconds to allow the partial evaporation of the solvent, it was dipped in t-butanol at a temperature of 40° C. and was, then, dipped in ice water for an hour, whereby a water-containing film having an anisotrropic structure was formed on the fabric. The film was dipped in ethanol and then in hexane for three hours each, and was allowed to dry at room temperature to yield a supporting film composed of a dense skin layer and a porous supporting layer, and reinforced by the nonwoven fabric.

The supporting film was coated with a solution of one of the four kinds of elastomeric polymers as shown in TABLE 1, so that a layer of the solution having a thickness of about 3 to 10 microns might be formed thereon. Then, it was dried at 80° C. for 30 minutes, whereby a composite membrane was obtained. Thus, four kinds of composite membranes were obtained.

Each composite membrane was evaluated for its rate of carbon dioxide permeation and its ideal carbon dioxide/methane separation factor. The results are shown in .ojoffTABLE 1.

The composite membrane of EXAMPLE 1 was evaluated for its rates of permeation for various gases and its ideal separation factors for methane. The results are shown in TABLE 2.

EXAMPLES 5 to 10

Composite fluorine-containing polyimide membranes were made by repeating EXAMPLES 1 to 4, except that the film-forming solution contained 4 parts by weight of dioxane as a swelling agent. Each membrane was evaluated for its permeability to carbon dioxide and its separation factor for methane. The results are shown in TABLE 3.

EXAMPLES 11 to 21

Different proportions, as shown in TABLE 4, of the flourine-containing polyimide resin as prepared in EXAMPLE 1 were added to N,N'-dimethylacetamide (DMAc) or N-methyl-2-pyrrolidone (NMP) as a first organic solvent, and were dissolved therein by at least 48 hours of stirring, whereby viscous polyimide solutions were obtained. Each solution was filtered under pressure in the presence of nitrogen gas, and the filtrate was debubbled at a reduced pressure to yield a uniform and transparent yellow film-forming solution. The film-forming solutions were each cast on a nonwoven polyester fabric at a specific surface velocity by an applicator to form a layer having a specific thickness thereon. After a part of the solvent had been allowed to evaporate, the coated fabric was dipped in a second organic solvent at a specific temperature and then in ice water, whereby a water-containing film having an anisotropic structure was formed on the fabric. The film was dipped in ethanol and then in hexane for three hour each, was allowed to dry at room temperature, and was heat treated at 100° C. and 150° C. for an hour each, and at 200° C. for 0.5 hour to yield an asymmetric membrane composed of a dense skin layer and a porous supporting layer, and reinforced by the nonwoven fabric.

Each of the asymmetric membranes which had been formed as hereinabove described was evaluated for its rates of permeation for carbon dioxide and methane and its ideal carbon dioxide/methane separation factor. The results are shown in TABLE 4, which also shows the thickness, temperature, and other details.

The asymmetric membrane of EXAMPLE 16 was evaluated for its rates of permeations for various gases and its ideal separation factor for methane. The results are shown in TABLE 5.

EXAMPLES 22 to 25

Asymmetrical fluorine-containing polyimide membranes were made by repeating EXAMPLES 11 to 21, except that a swelling agent was added to the film-forming solution, and that a relatively coarse nonwoven polyester fabric was employed as the supporting material. Each membrane was evaluated for its rates of permeation to carbon dioxide and methane and its ideal separation factor for methane. The results are shown in TABLE 6.

TABLE 2

| Gas | Rate of permeation (cm$^3$ (STP)/cm$^2$ · sec · cmHg) | Separation factor relative to CH$_4$ |
|---|---|---|
| Ar | $1.6 \times 10^{-3}$ | 149 |
| H$_2$ | $1.6 \times 10^{-3}$ | 145 |
| CO$_2$ | $7.2 \times 10^{-4}$ | 63 |
| O$_2$ | $1.3 \times 10^{-4}$ | 12 |
| CO | $2.2 \times 10^{-5}$ | 2 |
| N$_2$ | $1.9 \times 10^{-5}$ | 1.7 |
| CH$_4$ | $1.1 \times 10^{-5}$ | 1.0 |

TABLE 3

| | Elastomeric polymer solution | | Concentration | CO$_2$CH$_4$ separation factor of | Gas permeability of composite film | |
|---|---|---|---|---|---|---|
| Example | Elastomeric polymer | Solvent | (wt. %) | elasmeric polymer | Rate of CO$_2$ permeation (cc(STP)cm$^2$ · sec · cmHg) | CO$_2$/CH$_4$ separation factor |
| 5 | polyester polyol | Chloroform | 1.0 | 10 | $8.0 \times 10^{-4}$ | 61 |
| 6 | Polyurethane polyol | Tetrahydrofuran | 1.0 | 11 | $7.4 \times 10^{-4}$ | 51 |
| 7 | Polyurethane polyester | Tetrahydrofuran | 1.0 | 19 | $1.7 \times 10^{-4}$ | 64 |
| 8 | Polyamide polyether | Chloroform | 0.5 | 9 | $9.5 \times 10^{-4}$ | 44 |
| 9 | Epoxy resin[1] | Toluene | 5.0 | 15 | $2.3 \times 10^{-4}$ | 47 |
| 10 | Ethylsellulose[2] | Chloroform | 2.0 | 18 | $1.0 \times 10^{-4}$ | 52 |

Note:
[1] Comprises 100 parts of Epon (828) (product of Shell Chemical Co., Ltd.), 10 parts of IBN (a butadiene-acrylonitrile copolymer containing an end carboxyl group) as a curing agent, and 5 parts of tatramethylguanidine, and cuired by heating at 180° C. for an hour.
[2] Heated at 60° C. for 30 min.

TABLE 4

| Example | Solid content of film-forming solution (wt. %) | First organic solvent | Coating speed film-forming solution (cm/s) | Coating thickness (μm) | Evaporation time of first solvent (sec) | Second organic solvent | Diping temperature of second solvent (°C.) | Diping time of second solvent (sec) | Rate of CO$_2$ permeation cm$^3$ (STP)/ cm$^2$ · sec · cmHg | Rate of CH$_4$ permeation cm$^3$ (STP)/ cm$^2$ · sec · cmHg | CO$_2$/CH$_4$ separate factor |
|---|---|---|---|---|---|---|---|---|---|---|---|
| 11 | 5 | DMAc | 3 | 250 | 60 | Isopropanol | 3 | 5 | $1.8 \times 10^{-4}$ | $7.8 \times 10^{-6}$ | 23 |
| 12 | 5 | DMAc | 3 | 200 | 30 | Isopropanol | 20 | 5 | $4.1 \times 10^{-4}$ | $2.4 \times 10^{-5}$ | 17 |
| 13 | 5 | DMAc | 5 | 200 | 40 | t-butanol | 20 | 10 | $2.9 \times 10^{-4}$ | $1.4 \times 10^{-5}$ | 21 |
| 14 | 6 | NMP | 5 | 250 | 50 | t-butanol | 20 | 10 | $1.2 \times 10^{-3}$ | $8.6 \times 10^{-5}$ | 14 |
| 15 | 6 | NMP | 10 | 150 | 60 | t-butanol | 30 | 10 | $3.2 \times 10^{-4}$ | $1.6 \times 10^{-5}$ | 20 |
| 16 | 8 | NMP | 7 | 200 | 60 | t-butanol | 40 | 15 | $1.0 \times 10^{-3}$ | $2.5 \times 10^{-5}$ | 36 |
| 17 | 8 | NMP | 3 | 250 | 90 | Isopropanol | 10 | 25 | $6.7 \times 10^{-4}$ | $2.2 \times 10^{-5}$ | 30 |
| 18 | 8 | NMP | 7 | 150 | 90 | Isopropanol | 30 | 20 | $2.1 \times 10^{-4}$ | $4.7 \times 10^{-6}$ | 45 |
| 19 | 10 | NMP | 5 | 100 | 30 | Isopropanol | 20 | 30 | $9.3 \times 10^{-5}$ | $2.3 \times 10^{-6}$ | 41 |
| 20 | 10 | NMP | 5 | 200 | 120 | t-butanol | 45 | 30 | $5.4 \times 10^{-5}$ | $1.1 \times 10^{-6}$ | 49 |
| 21 | 10 | NMP | 1 | 250 | 90 | t-butanol | 50 | 30 | $1.9 \times 10^{-5}$ | $3.7 \times 10^{-7}$ | 51 |

Note: Gas permeation tests were conducted at a temperature of 25° C. with a pressure difference of 2 atms between both sides of a film.

EXAMPLE 26

An asymmetric membrane was made by repeating EXAMPLE 20 from the fluorine-containing polyimide resin as prepared in EXAMPLE 1. It showed permeation rates of $5.3 \times 10^{-3}$ cm$^3$(STEP)cm$^2$ sec cmHg and $1.6 \times 10^{-6}$ cm$^3$(STP)cm$^2$ sec cmHg to steam and nitrogen, respectively, and an ideal steam/nitrogen separation factor of 3300.

TABLE 5

| Gas | Rate of permeation (cm$^3$ (STP)/cm$^2$ · sec · cmHg) | Separation factor relative to CH$_4$ |
|---|---|---|
| Ar | $1.9 \times 10^{-3}$ | 68 |
| H$_2$ | $1.8 \times 10^{-3}$ | 64 |
| CO$_2$ | $1.0 \times 10^{-3}$ | 36 |
| O$_2$ | $3.0 \times 10^{-4}$ | 11 |
| CO | $1.1 \times 10^{-4}$ | 3.9 |
| N$_2$ | $5.4 \times 10^{-5}$ | 1.9 |
| CH$_4$ | $2.8 \times 10^{-5}$ | 1.0 |

TABLE 1

| | Elastomeric polymer solution | | Concentration | CO$_2$CH$_4$ separation factor of | Gas permeability of composite film | |
|---|---|---|---|---|---|---|
| Example | Elastomeric polymer | Solvent | (wt. %) | elasmeric polymer | Rate of CO$_2$ permeation (cc(STP)/cm$^2$ · sec · cmHg) | CO$_2$/CH$_4$ separation factor |
| 1 | Poly(4-methylpentene-1) | Cyclohexane | 0.5 | 5.4 | $7.2 \times 10^{-4}$ | 63 |
| 2 | Butadiene-styrene copolymer | Toluene | 1.0 | 18 | $4.5 \times 10^{-4}$ | 60 |
| 3 | Polyisobutylene | Isooctane | 0.5 | 11 | $6.1 \times 10^{-4}$ | 57 |
| 4 | Isoprene-isobutylene copolymer | Toluene | 1.0 | 12 | $2.0 \times 10^{-4}$ | 41 |

TABLE 6

| Example | Flourine-containing polyimide concentration (wt. %) | First organic solvent | Swelling agent | Swelling agent concentration (wt. %) | Second organic solvent | Diping temperature of second solvent (°C.) | Diping time of second solvent (sec) | Rate of $CO_2$ permeation $cm^3$ (STP)/ $cm^2 \cdot sec \cdot cmHg$ | Rate of $CH_4$ permeation $cm^3$ (STP)/ $cm^2 \cdot sec \cdot cmHg$ | $CO_2/CH_4$ separate factor |
|---|---|---|---|---|---|---|---|---|---|---|
| 22 | 6 | NMP | Dioxane | 3 | Isopropanol | 3 | 10 | $9.2 \times 10^{-4}$ | $2.8 \times 10^{-5}$ | 33 |
| 23 | 6 | NMP | Dioxane | 3 | t-butanol | 40 | 15 | $1.3 \times 10^{-3}$ | $4.7 \times 10^{-5}$ | 28 |
| 24 | 5 | NMP | Tetrahydrofuran | 3 | Isopropanol | 3 | 10 | $6.0 \times 10^{-4}$ | $2.7 \times 10^{-5}$ | 22 |
| 25 | 5 | NMP | Tetrahydrofuran | 3 | t-butanol | 40 | 15 | $3.3 \times 10^{-4}$ | $8.9 \times 10^{-6}$ | 37 |

What is claimed is:

1. A composite fluorine-containing polyimide membrane comprising a supporting film of a fluorine-containing polyimide resin consisting mainly of repeating units represented by formula 1

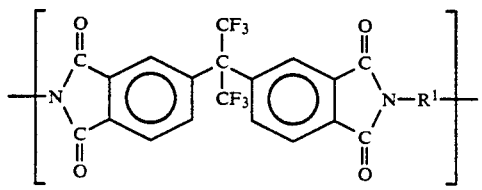

(1)

where $R^1$ is a divalent aromatic, alicyclic or aliphatic hydrocarbon group, or a divalent organic group comprising divalent aromatic, alicyclic or aliphatic hydrocarbon groups bonded to each other by a divalent organic bonding group; and thin film of an elastomeric polymer formed on said supporting film.

2. An asymmetric fluorine-containing polyimide membrane comprising a fluorine-containing polyimide resin consisting mainly of repeating units represented by formula 1

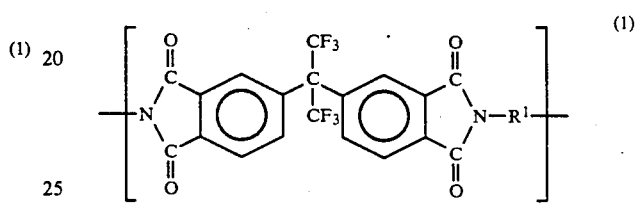

(1)

where $R^1$ is a divalent aromatic, alicyclic or aliphatic hydrocarbon group, or a divalent organic group comprising divalent aromatic, alicyclic or aliphatic hydrocarbon groups bonded to each other by a divalent organic bonding group, said film having an anisotropic structure.

* * * * *